E. P. Moorewood.
Metal Plating.
Nº 3,746.            Patented Sept. 17, 1844.
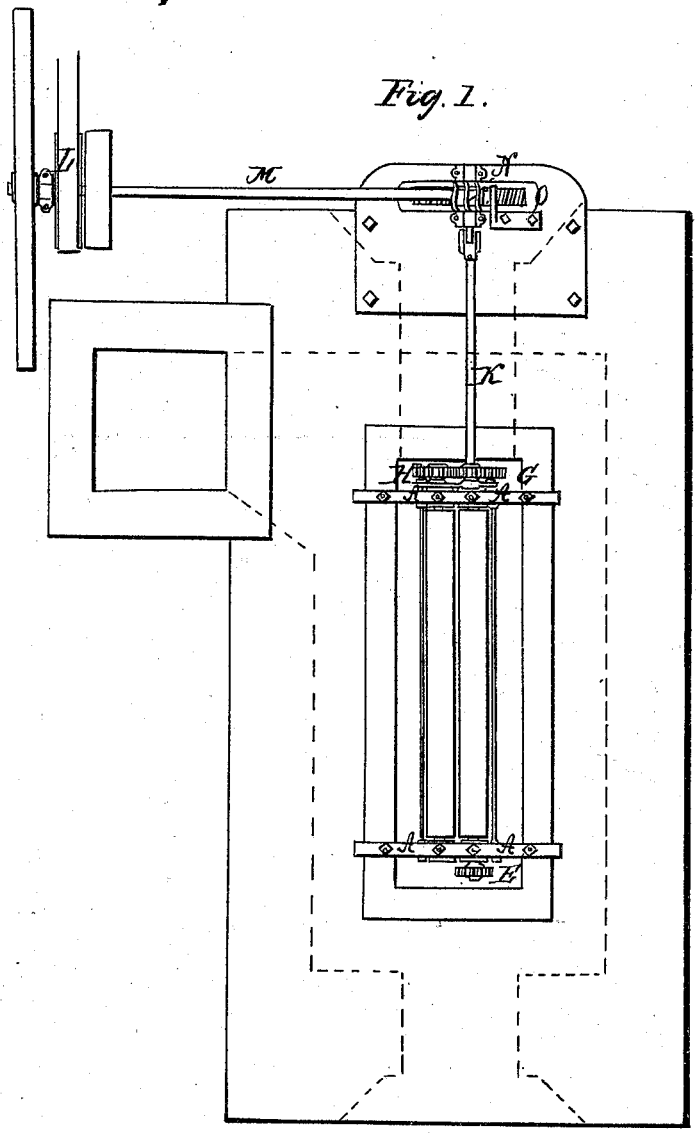
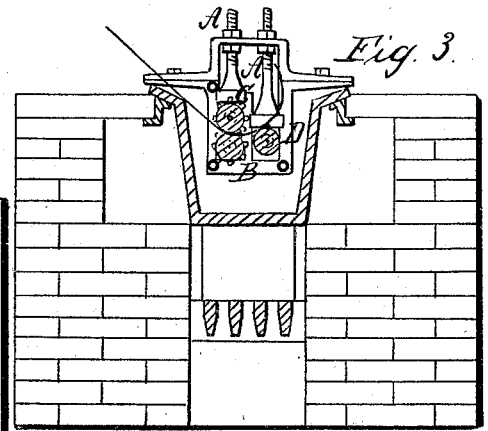
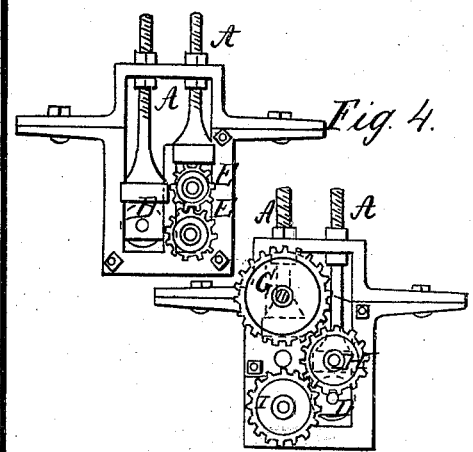
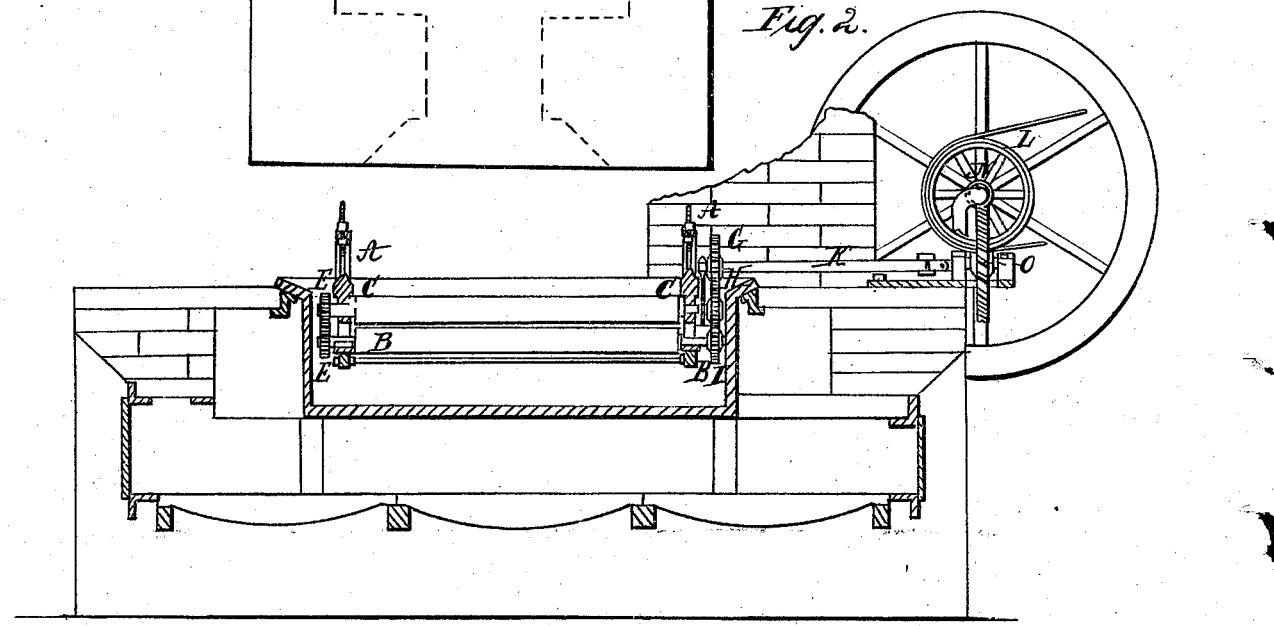

UNITED STATES PATENT OFFICE.

EDMUND P. MOREWOOD, OF NEW YORK.

IMPROVEMENT IN COATING IRON AND COPPER WITH TIN AND OTHER METALS.

Specification forming part of Letters Patent No. 3,746, dated September 17, 1844.

*To all whom it may concern:*

Be it known that I, EDMUND P. MOREWOOD, a subject of the Queen of Great Britain, residing in the State of New York, have invented a new and useful Improvement in the Method of Coating Sheets and Other Suitable Pieces of Iron or Copper with Tin by Precipitation and of Subsequently Coating them with Zinc or other Suitable Metal in a Molten State; and I do hereby declare that the following is a full and exact description of my method of accomplishing the said object and of carrying into effect my improvement.

Having perfectly cleaned and freed the surfaces of the iron or other metal from oxide or from dirt by any of the known modes, if the plates are not to be used at once I put them into a tank containing water slightly acidulated with muriatic or sulphuric acid. When I wish to give to the iron or other metal to be coated a first coating of tin, I proceed in the following manner: I first prepare a soluble salt of tin. I prefer for the purpose the chloride, which may be made by pouring muriatic acid upon tin contained in a suitable earthenware vessel. When the tin and the acid have remained together about two days, so that the acid shall be nearly neutralized, the solution is ready for use. Of this solution I put two or three quarts to each one hundred gallons of water contained in a tank, which I prefer being made of wood. I then sprinkle granulated or small pieces of zinc over the bottom of the tank, and place upon them, under the surface of the solution, the pieces of iron or other metal intended to be tinned, throwing, also, upon and among them other small pieces of zinc in such a manner that there may be contact in several places between the metal to be coated and the pieces of zinc, taking care, also, that the iron or metal to be coated shall be as much exposed to the solution as possible.

If plates are to be tinned, I sprinkle small pieces of zinc over the bottom of the tank, as before, and then on the top of the zinc place a plate of the metal, and then another sprinkling of zinc, and so on alternately until the tank is sufficiently full. The upper plate must be entirely under the surface of the solution. When the charge has remained in the tank from one to four hours, according to the strength and temperature of the solution, a high temperature and a strong solution acting most rapidly, the plates will have usually received a sufficient coating of tin. If, however, in consequence of mismanagement or from any other cause they should not be sufficiently coated, they are to be taken out of the tank and at once transferred to another, where they are to be treated as before; or they may be put into a tub of clean water, and when another dose of the salt of tin has been added to the water in the tank they are to be returned thereto, having zinc in small pieces sprinkled among them, as before. In case the process is thus repeated, that side which before was upward should in this second process be downward. The pieces of metal thus tinned are then ready for the after process, to which they may either be taken directly from the tank or be put into a wooden vessel containing water slightly acidulated with sulphuric or muriatic acid, where they may be kept for several days before being subjected to the after process, or they may be dried over a clear fire without rusting.

After coating with tin in the manner set forth, I perform the coating with molten metal by placing plates or other suitable pieces of metal between the rollers of a machine, which rollers are made to revolve in contact with metal kept melted in a suitable vessel.

The machine used by me consists of a pair of rollers, one above the other, together with what I call a "back roller," which rollers are placed in a suitable frame to sustain the gudgeons or bearings, as shown in the annexed drawings. The back roller is used for the purpose of raising the sheets or plates out of the bath, but a bar of metal or other device may be made use of for this purpose. The pair of rollers are made to revolve in opposite directions, so that when a plate is introduced between the rollers it is carried forward by their revolution and, falling upon the back roller, which is placed above the level of the lower roller of the first-named pair of rollers, and is situated as near as convenient to the pair of revolving rollers, is so far curved upwardly that its end finds its way out at the surface of the molten metal. Directly that the end makes its appearance it should be taken hold of with a pair of tongs, so that when the plate leaves the rollers its onward motion may be kept up by the person whose duty it is to take it from the machine.

If the rollers are placed too near the side of the bath or vessel into which the plates are introduced, and in which the rollers with their frame and bearings are placed, the plates will be so much curved that they cannot be taken out with ease. This inconvenience may be overcome by diminishing the angle formed by the plate with the horizontal plane when entering the opening between the rollers through which the plates are made to pass, which may be done by placing the frame in which the rollers are secured so much out of square or perpendicular as to leave the center of the upper roller somewhat in the rear of the center of the under roller, considering the side of the rollers at which the plate enters— the front—or it may be done by removing the rollers to a greater distance from that side of the bath or vessel at which the plates are introduced. There is also to be a sufficient space between the side of the rollers from which the plates come out of the bath and the side of the bath on which they are taken out to prevent their being too much curved or being rubbed or scratched against the back of the bath while being removed from it. The rollers and other parts are to be so made that there shall be ample room for every part to work easily, particularly in the bearings of the axles of the rollers, and also in the cog-wheels; and if working in molten zinc I do not allow the rollers to stand still in the fluid metal. I therefore take them out whenever I cease working, and while removing them I continue to turn them so long as the metal adhering remains tolerably fluid. I make the rollers of wrought-iron, particularly if used in molten zinc, as that metal has much less action upon wrought-iron than upon cast-iron. When working I keep the surface of the fluid metal covered with a flux suitable to the molten metal used, as is well understood.

In the drawings, Figure 1 shows a plan of the bath with the machinery applied thereto. Fig. 2 shows a longitudinal section thereof. Fig. 3 shows a transverse section thereof. Fig. 4 shows two end views of the rollers by which the mode of giving motion thereto will be readily traced.

A A are screws working up and down, and thereby elevating or depressing the boxes in which the axles of the rollers work.

B is the box in which the lower roller works, and which is detached from the screw and fastened in the bottom of the frame.

C is the box of the axle of the upper roller attached to the screw, and is raised or depressed by it, thereby making the opening between the upper and lower roller wider or narrower, according to the thickness of the sheets or other pieces of metal to be introduced.

D is the box of the axle of the back roller, also attached to the screw and by it raised and depressed, so as to give the plates which strike against it after leaving the front rollers more or less curve.

E E are cog-wheels of the upper and lower rollers, the motion of the lower roller being communicated to the upper one of the cog-wheels by the teeth of the lower one working in the teeth of the upper one.

G is a cog-wheel on the driving-axle.

H is an intermediate cog-wheel, the object of which is to communicate the motion of the driving-shaft or axle to the lower cog-wheel.

I is a wheel which is attached to the lower roller and communicates to it the revolving motion which the wheel I receives from the middle cog.

K is the driving-axis. K may receive motion from a steam-engine or other power by a strap acting on a drum L, which drives the axis M, which has affixed thereon the screw N, which takes into and drives the screw-wheel O, which is affixed to the driving-shaft or axis K, the driving-axis K being in two parts coupled by a universal joint, to allow of variation in the position of the cog-wheel fixed thereon for giving motion to the rollers.

Before passing the plates of iron through the fluid metal, to be coated thereby, I have discovered that by having the cleaned plates dipped in clean water and then put into molten metal while still rather damp a considerable advantage is obtained. The water may be advantageously very slightly acidulated with muriatic acid. Care should be taken to avoid putting the plates into the molten metal too wet, and to avoid suffering them to remain exposed to the air sufficiently long to cause oxidation or dust.

Having thus described the nature of my invention, and the best means known to me of carrying the same into effect, I remark that the use of the pieces of zinc placed in the vessel where the precipitation of the tin is performed is to precipitate the tin and cause it to attach itself as a coating to the sheets or plates of iron.

I claim as my invention and improvement—

1. The coating of sheets or plates or pieces of iron, or of copper, by the combination of the two operations above described, in the manner above set forth, or any other substantially the same, whereby the sheets or plates or pieces of iron, or of copper, are first coated with tin by precipitation, and then passed through a bath of molten metal, as above described, in order to give the second coating.

2. The machine or apparatus for coating of plates or sheets or pieces of iron, or of copper, by passing the same through a bath of molten metal, said apparatus or machine being constructed and arranged in the manner described, or in any other manner which is substantially the same; but as the processes of coating, first, by precipitation, and, secondly, by means of a bath of molten metal may be combined and consecutively used without the aid of the machine herein described, and as I believe this combined process to be substantially new, I claim said combination, whether the second process be performed by the aid of the machine or by that of dipping in the ordinary way.

By the use of the above improvements a considerable saving of expense is made in coating sheets or plates of iron and copper, especially of the larger kind, and when made the same are of superior quality.

EDMD. P. MOREWOOD.

Witnesses:
 THOS. P. JONES,
 MARSHALL LEFFERTS.